Feb. 20, 1968    G. R. ROSE    3,370,213
FORCE CONTROL SYSTEM FOR MANIPULATOR COMPONENT
Filed April 26, 1965    2 Sheets-Sheet 1
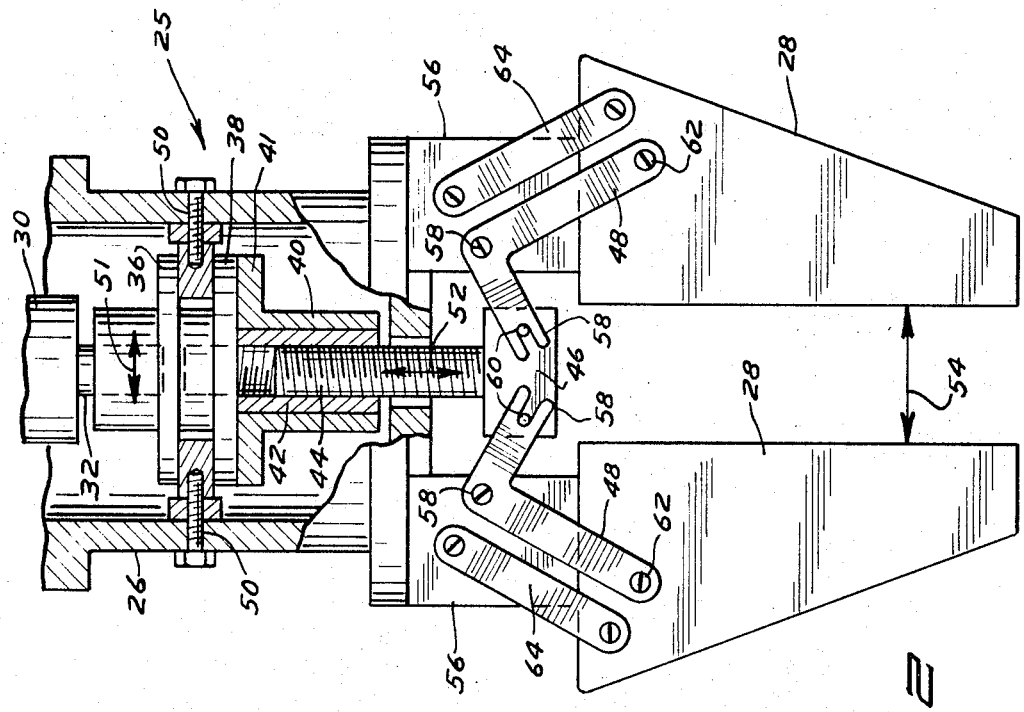
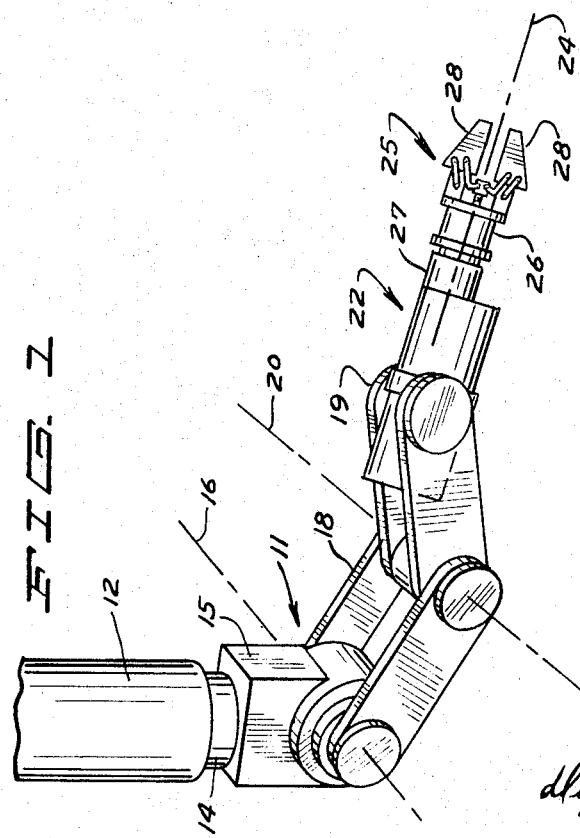
INVENTOR.
BY GLENN R. ROSE
Dugger Johnson & Westman
ATTORNEYS

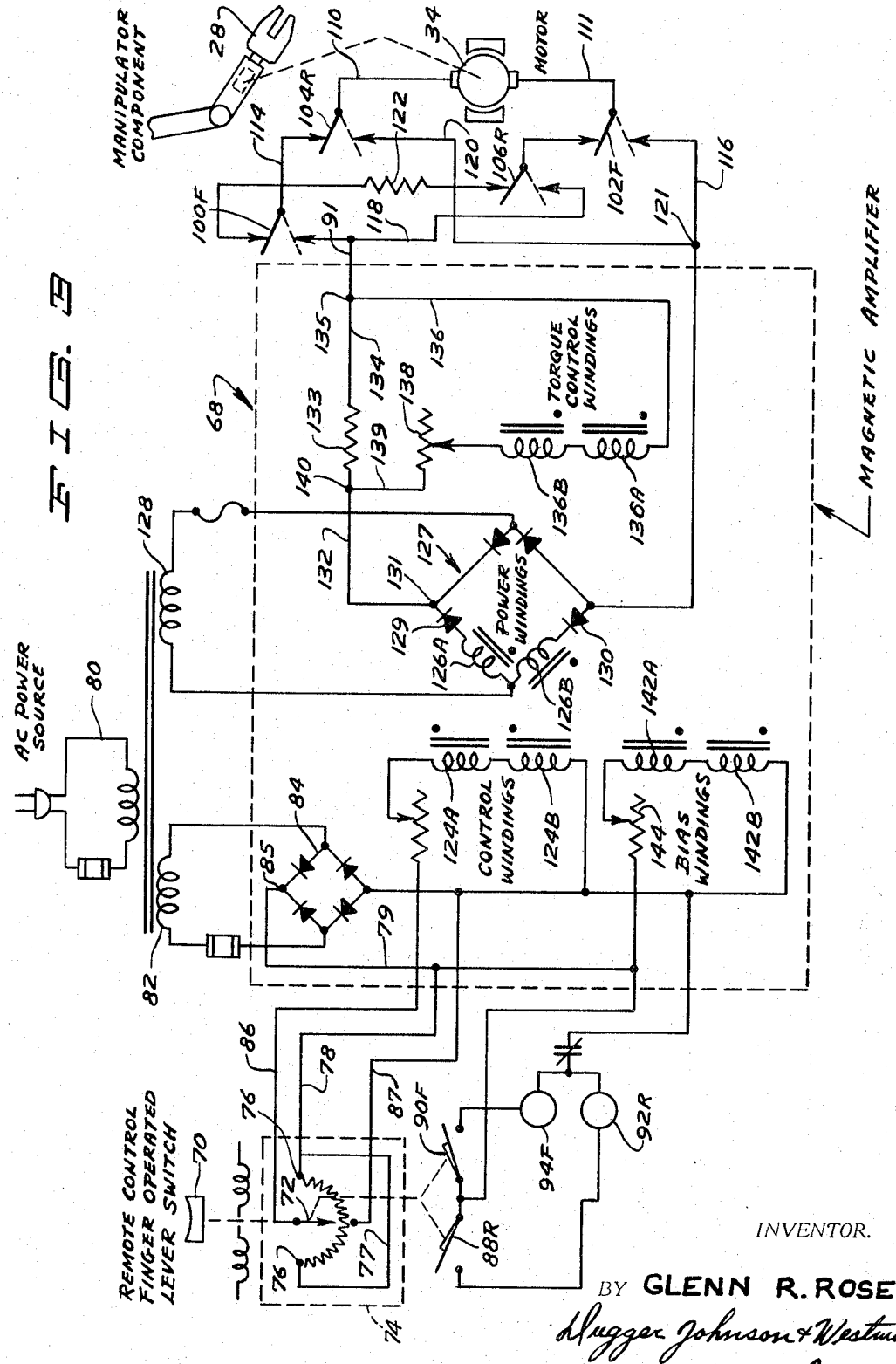

United States Patent Office 3,370,213
Patented Feb. 20, 1968

3,370,213
FORCE CONTROL SYSTEM FOR
MANIPULATOR COMPONENT
Glenn Richard Rose, St. Paul, Minn., assignor to Programmed & Remote Systems Corporation, St. Paul, Minn., a corporation of Minnesota
Filed Apr. 26, 1965, Ser. No. 450,899
1 Claim. (Cl. 318—513)

ABSTRACT OF THE DISCLOSURE

An electrical control circuit to selectively limit the gripping force exerted by gripping jaws on a remotely controlled manipulator. The circuit applies inverse electrical feedback to a magnetic amplifier used to power the motor that operates the gripping jaws of the manipulator. The output torque of the gripping jaw drive motor and consequently the force of the gripping jaws is made proportional to the grip motor current. The inverse electrical feedback to the winding of the magnetic amplifier driving the gripping jaw motor is proportional to the grip motor current and therefore a maximum limit is placed upon the output current of the magnetic amplifier. A variable torque control resistor is used in the feedback circuit to vary the amount of feedback current supplied to the magnetic amplifier and thus means are provided for adjusting the maximum limit of the gripping force.

---

This invention relates to means to electrically control the amount of force applied by the gripping jaws of a mechanical manipulator and more particularly to the application of inverse electrical feedback to the electrical power source for the grip motor to limit the maximum torque thereof and consequently limit the gripping force of the manipulator jaws.

The use of remotely controlled handling equipment, particularly for radioactive materials or materials in the vicinity of radioactivity, has increased tremendously in recent years. Many of the materials which must be handled are heavy and bulky and consequently a powerful gripping force is required. Frequently, however, the materials are very fragile and must be delicately handled. The various remote control handling systems that are now commercially available have not been suitable because they fail to provide means for effectively controlling the gripping force. Accordingly, the selection of the gripping force depends primarily on human judgment; and it suffices to say that the latter creates a risk which may be far out of proportion to the value of the manipulator itself. In other words, unless some control is provided, the mechanical manipulator may crush or break the delicate material and thus do more harm than good.

In order to selectively limit the gripping force exerted by the jaws of a manipulator, the present invention applies inverse electrical feedback to a magnetic amplifier used to power the grip motor of the manipulator. The output torque of the grip motor, and consequently the force of the gripping jaws, is made proportional to the grip motor current. By making the inverse electrical feedback to the winding of the magnetic amplifier proportional to the grip motor current, a maximum limit is placed upon the output current of the magnetic amplifier. A variable torque control resistor placed in the feedback circuit is used to vary the amount of feedback current supplied to the magnetic amplifier winding, and thus provides means for adjusting the maximum limit of the grip motor current. Accordingly, the maximum torque of the grip motor and the maximum force of the gripping jaws are also adjustable. An important advantage is manifested by a manipulator having a wide operational range, i.e., the manipulator is capable of handling exceptionally massive loads, yet is equally capable of handling very delicate loads.

It is, therefore, the principal object of this invention to provide a means for selectively and remotely controlling the maximum force applied by the gripping jaws of a mechanical manipulator.

Another object of this invention resides in the provision of means for applying inverse electrical feedback to a magnetic amplifier in proportion to the amplifier output current to thereby limit the maximum gripping force exerted by the gripping jaws of a mechanical manipulator.

In the drawings,

FIG. 1 is a fragmentary perspective view of a remotely controlled manipulator arm;

FIG. 2 is an enlarged partially sectional view showing in detail the gripping and activating components of the manipulator arm of FIG. 1; and FIG. 3 is a schematic illustration of the electrical control circuit according to the present invention.

Referring to the drawings and the numerals of reference thereon, a conventional manipulator arm or slave unit, generally designated 11, is shown mounted on the lower end of a telescoping tube support 12. Since the general structure of the manipulator arm as shown in FIG. 1 does not, per se, form a part of the present invention, and since it can be substantially modified without affecting its use with the present invention, it will not be described in great detail.

The tube support 12 is comprised of a plurality of axially slidable nested tubes. An inner tube 14, which is slidably mounted within the outer tubes, is movable in a vertical or axial direction and is attached to the shoulder member 15. The shoulder member 15 is mounted by conventional means (not shown) as to be continuously rotatable about the vertical axis of the telescoping tubes in either direction of rotation. An upper arm 18 is mounted to shoulder member 15 and is movable about a shoulder pivot axis illustrated at 16. The upper arm 18 is conventionally controlled by an upper arm pivot motor (not shown) and is movable in either direction about the axis 16 in a predetermined arc. The upper arm pivot motor creates a movement corresponding to the movement of a human upper arm about its shoulder pivot.

A forearm member 19 is connected to a lower portion of the upper arm member 18 and is movable about an elbow axis 20. The forearm member can also be controlled by a suitable forearm motor or elbow pivot motor which is also not shown for purposes of simplifying the disclosure. The forearm member is movable about elbow axis 20 in either direction of rotation for a predetermined arc.

Connected at the lower end of forearm member 19 is a wrist assembly 22 which is mounted for rotational movement about a wrist pivot axis 24. The wrist assembly 22 can be powered with a wrist pivot motor (not shown) through suitable chain linkages connected internally of the forearm and upper arm members. Wrist assembly 22 is movable in either direction of rotation about the axis 24.

A hand member, generally designated 25, and a pair of coacting gripping jaws 28 are shown mounted on the outer end of the wrist assembly 22. The hand member 25 includes a spool-shaped housing 26 which is mounted on an extendable or telescoping member 27. The extendable member 27 is slidably mounted in wrist assembly 22 and can be driven through a suitable hand extension motor (not shown) provided internally of the wrist assembly. The hand member 25 is also rotatably mounted with respect to the member 27 and is thus rotatable about the longitudinal axis thereof.

As will be appreciated, the foregoing manipulator arm achieves the quasi-human repertory of motions which are needed to position an object in space, namely, motion within six degrees of freedom: three to place the object in space (as defined by the three familiar coordinates X, Y and Z) and three to orient the object itself (in the attitudes known as pitch, roll and yaw).

FIGURE 2 shows the internal workings of the hand member 25 and the coacting gripping jaws 28. The numerals 30 and 32 refer, respectively, to the output hub and shaft of a grip motor 34 (shown in FIG. 3) which provides the power for opening and closing the gripping jaws 28. The linkage of output shaft 32 of grip motor 34 to the jaws 28 comprises: a magnetic clutch hub 36 which is connected to the output of shaft 32 and includes clutch plate 38; drive hub 40 having clutch pressure plate 41 which registers in engagement with clutch plate 38; inner drive sleeve 42; grip actuating screw 44; head member 46 which is fixedly connected on the lower end of screw 44; and coacting jaw links 48. Clutch hub 36 is in driving connection with drive hub 40 via the frictional contact of clutch plate 38 with the pressure plate 41 and its engagement therewith is controlled by a pair of diametrically opposed electromagnetic exciter coils 50. The latter are electrically energized from a suitable power center that is preferably associated with a remote control console. When the exciter coils 50 are energized and clutch hub 26 assumes rotation in one of the directions of double arrow 51, clutch pressure plate 38 comes in driving contact with pressure plate 41; and the hub 40, being in driving attachment with inner drive sleeve 42, causes corresponding rotation of the latter. Drive sleeve 42 is threadably mounted on the grip actuating screw 44 and thus its rotation thereon imparts longitudinal displacement of the screw 44 in one of the directions of double arrow 52. This longitudinal displacement is converted to opposed lateral displacement of jaws 28 in the direction of double arrow 54 by the interconnection of the coacting jaw links 48 between head member 46 and jaws 28 as in the manner described below.

Jaws 28 are slidably mounted on jaw support members 56 which in turn are fixedly secured at the lower end portions of housing 26. The jaw links 48 are each shown pivotally secured to their respective support member 56 by the provision of the pins 58. Pins 58 pass through the members 56 and protrude slightly on both sides whereby a second pair of coacting jaw links can similarly be mounted in conjunction with the opposite (hidden) side.

Jaw links 48 are shown having slotted ends 58 which operatively engage spaced pins 60 provided on head member 46. The opposite lower ends of the jaw links are pinned at 62 to their respective jaw 28. Accordingly, the longitudinal displacement of head member 46 imparts opposed lateral displacement of jaws 28 (due to the lever action of links 48 connected therebetween) and the same open or close depending upon the direction of rotation of the output shaft 32 of grip motor 34.

At 64 is shown auxiliary jaw links which are also respectively interconnected between the support members 56 and jaws 28. These links 64 reinforce and stabilize the linkage between support members 56 and jaws 28.

FIG. 3 shows the electrical circuitry originating from the finger-operated lever switch 70 which is spring centered to an "off" position. Switch 70 in turn controls the deflection of a wiper 72 of a center-tapped rheostat, generally designated 74. Rheostat 74 has its end points 76 joined by line 77 and a D.C. control current is fed into rheostat 74 via a rheostat input line 78. This D.C. current is derived from AC power source 80 through transformer 82 and full wave bridge rectifier 84. The D.C. current leaves rectifier 84 and is fed into the output junction 85 of rheostat input line 78 via connector line 79. The lines 86 and 87 serve as conductors for the output currents of the rheostat 74 in a manner conventional to devices of this type, i.e., the current flowing in line 87 remains constant while the magnitude of the current flowing in the line 86 is variable and will depend upon the position of the rheostat wiper 72 relative to its neutral center position. By interconnecting the rheostat end points 76 by the line 77, the end points are at substantially equal electrical potential and, accordingly, as the rheostat wiper 72 is moved off center, the rheostat output currents are of the same polarity regardless of the deflection direction of the wiper 72.

The output or control current leaving rheostat 74 via the line 86 is used as the input to a magnetic amplifier 68 having output line 91 which supplies the current for operating the grip motor 34, as will be described below. To control the direction of rotation of the motor 34 there is provided the direction switches 88R and 90F, which are linked to wiper arm 72 and control direction relays 92R and 94F, respectively. Direction relay 94F in turn controls forward motor control switches 100F and 102F while direction relay 92R controls reverse motor control switches 104R and 106R.

The circuitry which is shown for controlling the direction of the motor 34 is best understood by tracing its operation as follows: Assuming the finger switch 70 to be actuated to a "forward" position, the wiper arm 72 moves off center tap, causing switch 90F to close and relay 94F to be energized. Energizing relay 94F effects movement of the switches 100F and 102F into their dotted line positions of FIG. 3. The output current flowing in line 91 then assumes a continuous clockwise loop represented by switch 100F, conductor 114, switch 104R, first motor lead 110, motor 34, second motor lead 111, switch 102F and amplifier return line 116.

To reverse directions, the finger switch 70 is moved to a "reverse" position and the following occurs: wiper arm 72 is deflected to an opposite off center tap position, causing switch 88R to close and switch 90F to open (the opening of switch 90F causes relay 94F to deenergize and switches 100F and 102F to return to their normal or full line positions of FIG. 3), relay 92R is energized, and switches 104R and 106R move to their dotted line positions of FIG. 3. Accordingly, the output current flowing in line 91 assumes a continuous counter-clockwise loop represented by line 118, switch 106R, switch 102F, motor lead 111, motor 34, motor lead 110, switch 104R and connector line 120 which is joined to the amplifier return line 116 at junction 121.

A dynamic braking resistor 122 is used to bring the motion to a quick stop when the lever switch 70 is restored to its "off" position.

The magnetic amplifier 68 utilizes two magnetic cores, each wound with power windings and control windings. Both cores are preferably of the toroidal type and are composed of grain-oriented silicon steel. The windings which occur on the first of these cores will be designated with an "A" while the windings which occur on the second core will be designated with a "B."

The control winding 124A and 124B are connected in series as shown and are driven from the variable control current leaving the line 86 of the rheostat 74. The power windings, designated 126A and 126B, are placed in adjacent legs of a standard fullwave bridge rectifier generally designated 127, which is supplied by a second transformer 128. Under the condition of zero control current (when wiper 72 is at neutral position), these power windings present a high impedance in series with the rectifiers 129 and 130, respectively. As the control current is increased, the magnetic cores begin to saturate, causing the impedance of the power windings to drop and consequently increase the current leaving a bridge output junction 131. The current leaving the junction 131 is fed via line 132, resistor 133 and line 134 to the amplifier output line 91. As the variable control current supplied from the rheostat 74 is fed to the control windings 124A and 124B, the amplifier output current flowing in line 91 varies proportionately in a manner conventional to magnetic amplifiers of this type. Since the output torque of the motor 34 is directly proportional to the current applied to it, less internal losses, the torque exerted by the motor 34 is controlled by adjustment of the rheostat wiper 72. Depending upon the construction of the cores and the number of control and power windings, it is possible to achieve suitable power gain to enable the operator to precisely control the torque exerted by the motor 34 by mere adjustment of the rheostat wiper 72.

FORCE CONTROL CIRCUITRY

The force control circuitry is designed to impose a maximum limit upon the current being fed into the grip motor 34 and consequently place a maximum on the force exerted by the jaws. To accomplish this, there is shown the feedback loop consisting of line 136 and junction 135, torque control winding 136A, torque control winding 136B, variable resistor 138, line 139 and junction 140. The operation of this feedback circuitry is as follows: The output current flowing in line 134 is sampled by the voltage drop across variable resistor 138 and this voltage drop is proportional to the current being fed into the grip motor 34. This representative voltage drop is applied as inverse electrical feedback to the torque control windings 136A and 136B, connected in series as shown. Variable resistor 138 thus controls the current flowing through the torque control windings and therefore ultimately controls the output current of the magnetic amplifier, the output current being inversely proportional to the amount of feedback current being fed to the torque control windings 136A and 136B. Note that junction 140 serves as a summation point for the current leaving the bridge rectifier junction 131 and the feedback current returning via the line 139. The current flowing in the output line 91 represents the portion of the bridge rectifier current that is not conducted via the feedback loop but passes the junction 135 and thus represents the output current of the amplifier. Since the current being fed to the grip motor 34 is proportional to the amplifier output current and the latter is determined by the feeback current flowing in the torque control windings 136A and 136B, the value placed on the variable resistor 138 thus determines the magnitude of the current fed into the grip motor 34 and, ultimately, the magnitude of the torque output on the motor shaft 32. The effect of the feedback loop is that a maximum limit is placed on the current fed to the grip motor 34. As the amplifier output current increases, the feedback current increases and thereby causes an opposing reduction in the output current of the amplifier. The effect is that the motor current never exceeds the maximum as predetermined by the value set on the variable resistor 138. Hence, a maximum is also imposed on the gripping force exerted by the jaws 28.

In addition to the power windings and control windings described above, the bias windings 142A and 142B are required. Without these bias windings, the cores would be saturated with the resulting full D.C. output at zero control current, i.e. the current flowing in the power windings may be sufficient to cause self saturation. With the application of the proper value of fixed bias current of opposite polarity to the control current, the amplifier output current is set as its minimum at zero control current. The bias current serves as a bucking current to the control current and thus establishes a suitable threshold which must be overcome by the control current before amplifier output is obtained.

The advantages of the invention are those derived from the provision of a gripping force control which can be situated on a remote console, and the sole operational procedure required is the preselection of the value of the resistor 138. Preferably, a graduated scale is provided in conjunction with a dial controlling the value of the resistor 138, and thereby provides means for directly correlating grip motor current with the gripping force exerted by the jaw 28.

What is claimed is:

1. The combination with drive means for selectively opening or closing the gripping jaws of a manipulator, a source of alternating current, a motor in driving connection with said drive means of said manipulator jaws, magnetic amplifier means including means for receiving current from said alternating source and converting it to unidirectional output current to drive said motor, said amplifier means having core means, input means including bias and control windings on the core means, output means including power windings on the core means, output lines leading from the power windings and connected to supply current to drive said motor, reversing switch means between the motor and the output lines of said power windings to selectively reverse the current flow from the amplifier means to said motor to open or close said jaws, relay means for controlling said reversing switch means, an actuator switch for selectively controlling said relay means, said actuator switch further including rheostat means regulating current to the input means, torque control windings on said core means, feedback circuit means for providing an inverse feedback current path between an output line of said amplifier and said torque control windings, and a variable resistor in said feedback circuit means connected in series with said torque control windings to control the current flowing through the torque control windings, said bias windings being connected in the input circuit to provide a bucking current to said control windings to establish a suitable threshold current which must be overcome by the input current before amplifier output is obtained.

References Cited

UNITED STATES PATENTS 2,754,463  7/1956  Hansen et al. _____ 318—513 X
3,295,040  12/1966  Schieman _____ 318—513 X ORIS L. RADER, *Primary Examiner.*

B. A. COOPER, *Assistant Examiner.*